LAPHAM & WILSON.
Churn.
No. 22,879.
Patented Feb. 8, 1859.
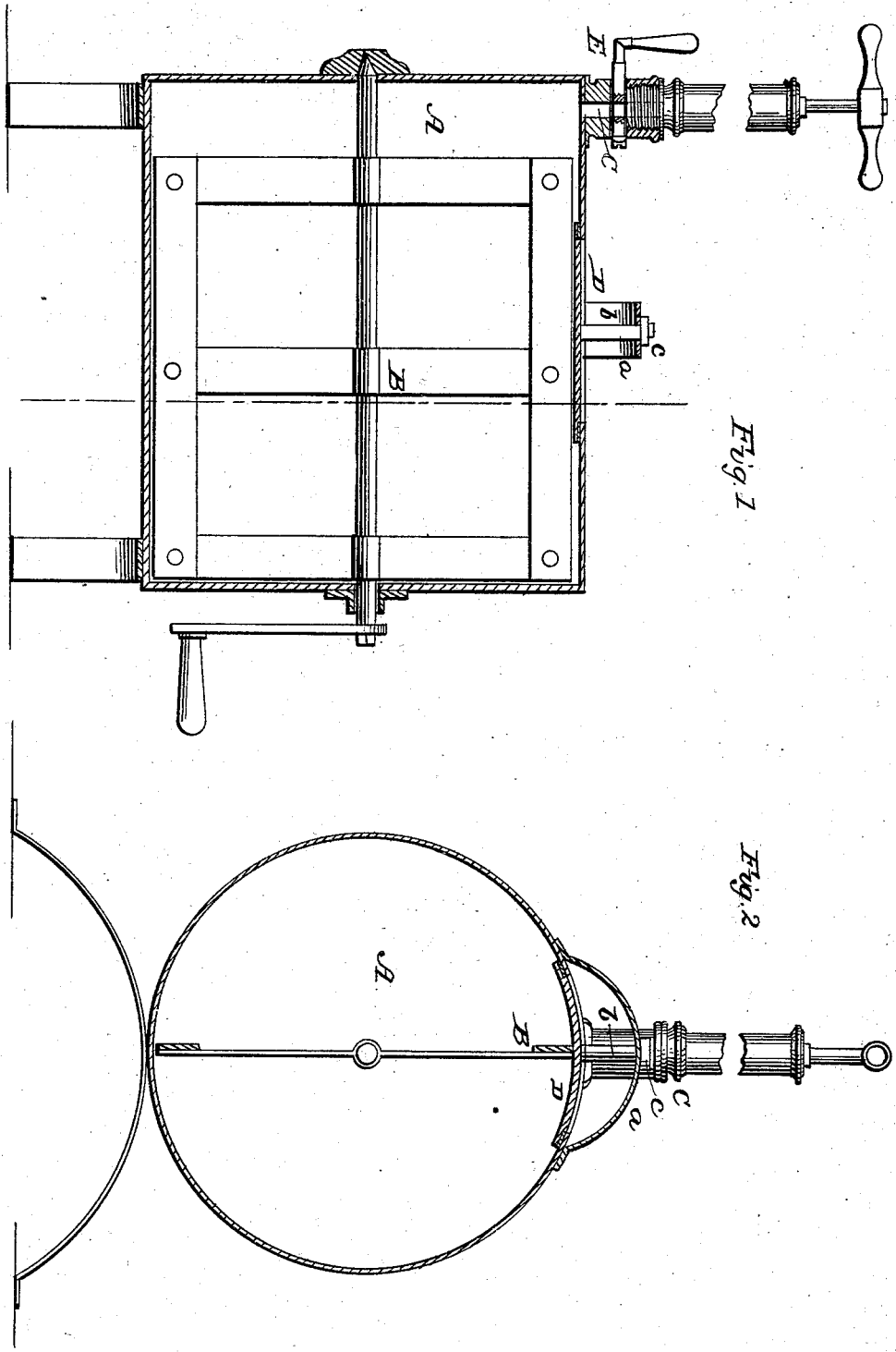

UNITED STATES PATENT OFFICE.

RUFUS LAPHAM AND RILEY P. WILSON, OF NEW YORK, N. Y.

CHURN.

Specification of Letters Patent No. 22,879, dated February 8, 1859.

*To all whom it may concern:*

Be it known that we, R. LAPHAM and R. P. WILSON, of the city, county, and State of New York, have invented a new and useful Improvement in Churning Butter; and we do hereby declare that the following is a full, clear, and exact description of the same, reference being had to the accompanying drawings, forming a part of this specification, in which—

Figure 1, is a vertical longitudinal section of a churn adapted for carrying out our invention. Fig. 2, is a vertical transverse section of the same.

Similar letters of reference, in each of the several figures indicate corresponding parts.

The nature of our invention consists in churning butter by means of the combined action of compressed or expanded atmosphere, and agitation, in an air tight vessel; the pressure when the air is compressed being exerted externally and when it is expanded exerted internally upon the globules or sacks containing fatty matter, as hereinafter specified.

To enable others, skilled in the art, to make and use our invention, we will proceed to describe its construction and operation.

In carrying out our invention, we employ an air tight vessel A, or any other shaped vessel which is capable of agitating the milk or cream by motion in itself, or which is stationary and provided with a reciprocating or rotating dasher B. With the vessel A, we have an air pump C, communicate, as shown in the drawing or in any other manner. Into the air tight vessel the cream or milk is poured through the packed door or opening D, until the cream rises to about a level with the shaft. The door or opening is then closed air tight, by any suitable mechanical means, or as shown in the drawing by means of a clamp *a*, screw *b*, and nut *c*. The air is now pumped into the vessel A, as compactly as may be found practicable without endangering the vessel and other parts of the churn, and confined in the same by means of a cock E. The pump may now be removed. By thus forcing air into the churn, the globules or sacks containing fatty matter are thrown more compactly together and measurably compressed and by operating the dasher speedily for about two or three minutes, butter will be produced, owing to the sacks or globules being thrown by and in contact with each other and a sufficient chafing or friction between themselves and the. compressed atmosphere being produced, to effect the breaking of the sacks and a speedy escape of the fatty matter and its collection into a mass. The production of the butter is also facilitated by reason of a more even temperature in the air-tight vessel being maintained, or by reason of the heat evolved during the agitating process being retained within the churn instead of being allowed to escape and pass off as in churns open to the atmosphere, and thus made available for keeping the cream at a proper churning temperature.

Instead of pumping air into the churn, a somewhat similar effect may be produced by exhausting the air from the vessel A, for by so doing, a partial vacuum is formed, and the globules or sacks expand and enlarge, and thus become very thin, and consequently when the dasher is speedily moved through them they are readily broken, or will, by contact with each other and with the sides of the vessel, more easily break and thus allow the fatty matter to escape and collect into a mass.

It will be observed that we have been very general in the description of the mechanical means we employ for carrying out our invention. This we deemed necessary, as the gist of our invention does not lie in any mechanical device or devices but as before stated in the accomplishment of the churning of butter by the combined agency of compressed or expanded atmosphere and agitation, in an air tight vessel, whatever be the means employed to bring the same into use, not however, intending to cover by this any superior or novel mechanical devices which subsequent inventors may contrive, but simplify to render the users of such devices subject to our patent in the use of their inventions.

What we claim as our invention and desire to secure by Letters Patent, is

The use of an exhausting or condensing pump in connection with the cream reservoir as set forth for the purpose of forcing air upon the upper surface of the cream or withdrawing it from it, in the manner described, and for the purpose set forth.

RUFUS LAPHAM.
RILEY P. WILSON.

Witnesses:
HENRY E. BOEDER,
HENRY N. BENNETT.